US012641413B2

(12) United States Patent
Cataquis et al.

(10) Patent No.: US 12,641,413 B2
(45) Date of Patent: *May 26, 2026

(54) LOCATION BASED ROUTING THAT BYPASSES CIRCUIT-BASED NETWORKS

(71) Applicant: T-Mobile USA, Inc., Bellevue, WA (US)

(72) Inventors: Jason Cataquis, Bellevue, WA (US); Dennis Romero, Mine HIll, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 419 days.

This patent is subject to a terminal disclaimer.

(21) Appl. No.: 18/326,970

(22) Filed: May 31, 2023

(65) Prior Publication Data

US 2023/0308859 A1     Sep. 28, 2023

Related U.S. Application Data

(63) Continuation of application No. 17/349,620, filed on Jun. 16, 2021, now Pat. No. 11,706,607.

(51) Int. Cl.
*H04W 8/18* (2009.01)
*H04W 4/02* (2018.01)
*H04W 4/029* (2018.01)
*H04W 8/26* (2009.01)

(52) U.S. Cl.
CPC .......... *H04W 8/183* (2013.01); *H04W 4/023* (2013.01); *H04W 4/029* (2018.02); *H04W 8/26* (2013.01)

(58) Field of Classification Search
CPC ..... H04W 8/183; H04W 4/029; H04W 4/023; H04W 8/26
See application file for complete search history.

(56) References Cited

U.S. PATENT DOCUMENTS

| | | | |
|---|---|---|---|
| 6,014,380 A | 1/2000 | Hendel et al. | |
| 6,134,441 A | 10/2000 | Aestroem et al. | |
| 6,275,706 B1 | 8/2001 | Rune | |
| 6,661,782 B1 | 12/2003 | Mustajaervi et al. | |
| 6,683,865 B1 | 1/2004 | Garcia-luna-aceves et al. | |
| 6,760,343 B1 | 7/2004 | Krishnamurthy et al. | |
| 6,879,832 B1 | 4/2005 | Palm et al. | |

(Continued)

FOREIGN PATENT DOCUMENTS

| | | |
|---|---|---|
| CN | 1728750 B | 7/2012 |
| CN | 103379479 B | 8/2016 |

(Continued)

*Primary Examiner* — Erika A Washington
(74) *Attorney, Agent, or Firm* — Perkins Coie LLP

(57) ABSTRACT

Methods, devices, and system related to wireless communications are disclosed. In one example aspect, a method for wireless communications includes receiving, by a network node in a communication network, a packet associated with a call that has been initiated for a user device, and determining, by the network node, location information carried in a header of the packet. The method also includes determining, by the network node using a mapping between location information and Major Trading Area (MTA) values, an MTA value corresponding to the location information carried in the header, and routing, by the network node based on the MTA value, the packet using a routing path that bypasses a circuit-switched based network.

18 Claims, 10 Drawing Sheets

(56)                   References Cited

U.S. PATENT DOCUMENTS

| | | | |
|---|---|---|---|
| 6,888,803 | B1 | 5/2005 | Gentry et al. |
| 6,901,058 | B2 | 5/2005 | Lalwaney |
| 7,002,933 | B1 | 2/2006 | Poon et al. |
| 7,054,636 | B1 | 5/2006 | Howe |
| 7,061,896 | B2 | 6/2006 | Jabbari et al. |
| 7,245,917 | B2 | 7/2007 | Chiueh |
| 7,304,976 | B2 | 12/2007 | Mao et al. |
| 7,606,556 | B2 | 10/2009 | Poikselka et al. |
| 7,675,881 | B2 | 3/2010 | Verma et al. |
| 7,826,405 | B2 | 11/2010 | Shin et al. |
| 7,916,071 | B2 | 3/2011 | Harper |
| 7,983,229 | B2 | 7/2011 | Bachmann et al. |
| 8,065,419 | B2 | 11/2011 | Vimpari et al. |
| 8,145,190 | B2 | 3/2012 | Caldwell et al. |
| 8,213,913 | B2 | 7/2012 | Ghai et al. |
| 8,300,575 | B2 | 10/2012 | Willars |
| 8,374,631 | B2 | 2/2013 | Kall et al. |
| 8,379,599 | B2 | 2/2013 | Velev et al. |
| 8,423,758 | B2 | 4/2013 | Singhal |
| 8,520,615 | B2 | 8/2013 | Mehta et al. |
| 8,520,645 | B2 | 8/2013 | Saarela |
| 8,547,908 | B2 | 10/2013 | Marsico |
| 8,644,355 | B2 | 2/2014 | Agarwal et al. |
| 8,649,291 | B2 | 2/2014 | Wang et al. |
| 8,654,709 | B2 | 2/2014 | Centonza et al. |
| 8,737,304 | B2 | 5/2014 | Karuturi et al. |
| 8,761,764 | B2 | 6/2014 | Mccann et al. |
| 8,825,060 | B2 | 9/2014 | Mccann et al. |
| 8,849,715 | B2 | 9/2014 | Forbes |
| 8,942,747 | B2 | 1/2015 | Marsico |
| 9,179,475 | B2 | 11/2015 | Koleszar et al. |
| 9,491,575 | B2 | 11/2016 | Edge et al. |
| 9,807,602 | B2 | 10/2017 | Cherian et al. |
| 9,838,918 | B2 | 12/2017 | Guo |
| 10,075,420 | B2 | 9/2018 | Zhu et al. |
| 10,212,639 | B2 | 2/2019 | Kodaypak |
| 10,237,721 | B2 | 3/2019 | Gupta et al. |
| 11,706,607 | B1 * | 7/2023 | Cataquis .............. H04W 8/26 |
| | | | 455/445 |
| 2007/0291733 | A1 | 12/2007 | Doran et al. |
| 2009/0069035 | A1 | 3/2009 | Igval |
| 2009/0299788 | A1 | 12/2009 | Huber et al. |
| 2010/0103864 | A1 | 4/2010 | Ulupinar et al. |
| 2011/0235546 | A1 | 9/2011 | Horn et al. |
| 2011/0263263 | A1 | 10/2011 | Lau |
| 2021/0136633 | A1 | 5/2021 | Zetterlund et al. |

FOREIGN PATENT DOCUMENTS

| | | | |
|---|---|---|---|
| EP | 1560378 | B1 | 11/2012 |
| EP | 1991014 | B1 | 11/2012 |
| EP | 2110983 | B1 | 8/2016 |

* cited by examiner

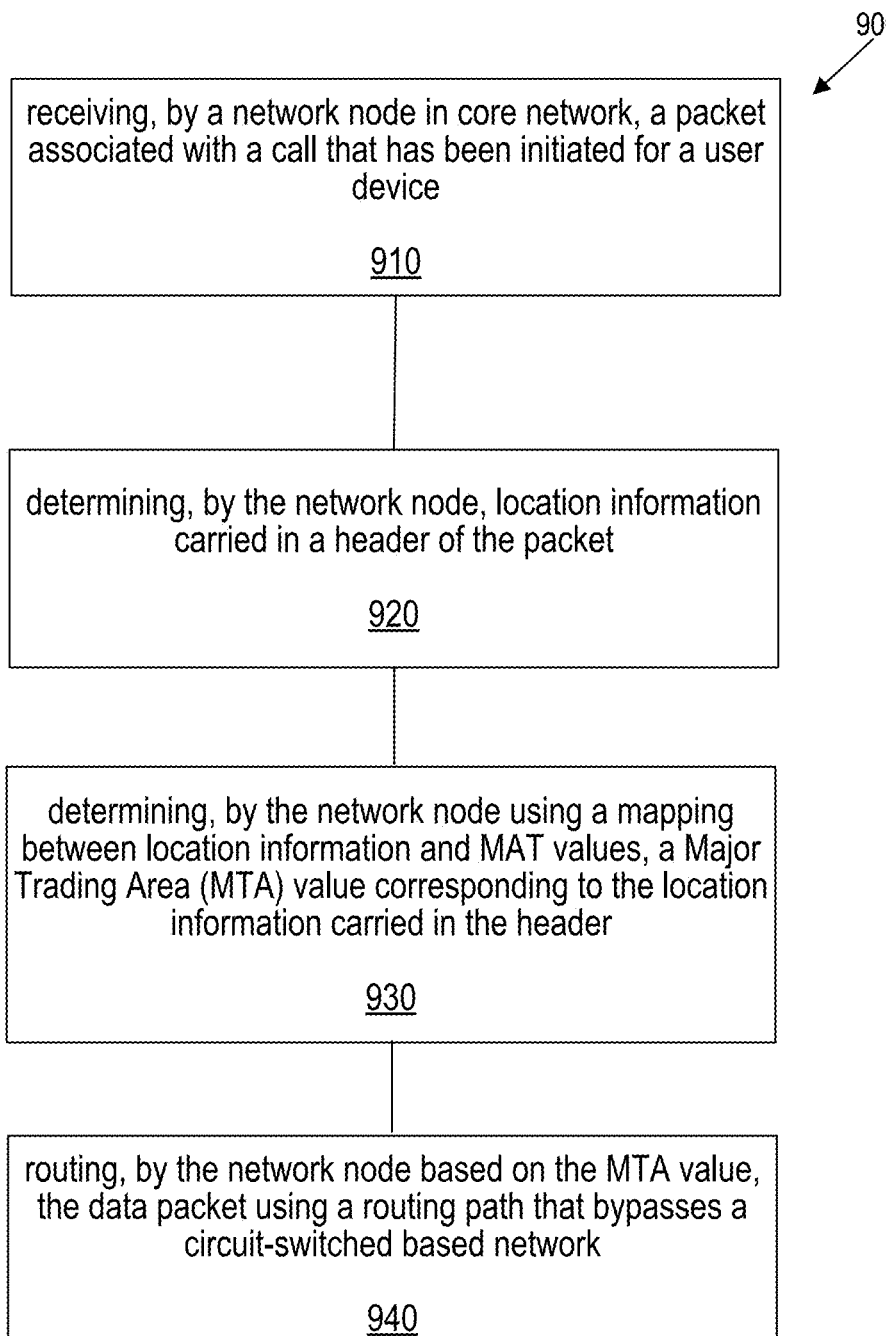

900 receiving, by a network node in core network, a packet associated with a call that has been initiated for a user device

910 determining, by the network node, location information carried in a header of the packet

920 determining, by the network node using a mapping between location information and MAT values, a Major Trading Area (MTA) value corresponding to the location information carried in the header

930 routing, by the network node based on the MTA value, the data packet using a routing path that bypasses a circuit-switched based network

LOCATION BASED ROUTING THAT BYPASSES CIRCUIT-BASED NETWORKS

CROSS-REFERENCE TO RELATED APPLICATIONS

This application is a continuation of U.S. patent application Ser. No. 17/349,620, filed on Jun. 16, 2021, entitled LOCATION BASED ROUTING THAT BYPASSES CIRCUIT-BASED NETWORKS, which is hereby incorporated by reference in its entirety.

BACKGROUND

In telecommunication, circuit switching is a method of establishing a dedicated communication channel (circuit) between two network nodes to allow the nodes to communicate. The circuit guarantees the full bandwidth of the channel and remains connected for the duration of the communication session. As telecommunication techniques evolve, packet switching, which groups data that is transmitted over a digital network into packets, becomes the primary basis for data communications in computer networks worldwide. However, circuit switching networks still exist across different access and transport areas. There is a need to adopt technologies that bypass the use of circuit switching networks, if needed, with the advances of telecommunication technologies.

BRIEF DESCRIPTION OF THE DRAWINGS

Detailed descriptions of implementations of the present invention will be described and explained through the use of the accompanying drawings.

FIG. 9 is a flow chart representation of a method for wireless communication in accordance with one or more embodiments of the present technology.

Figure 1:
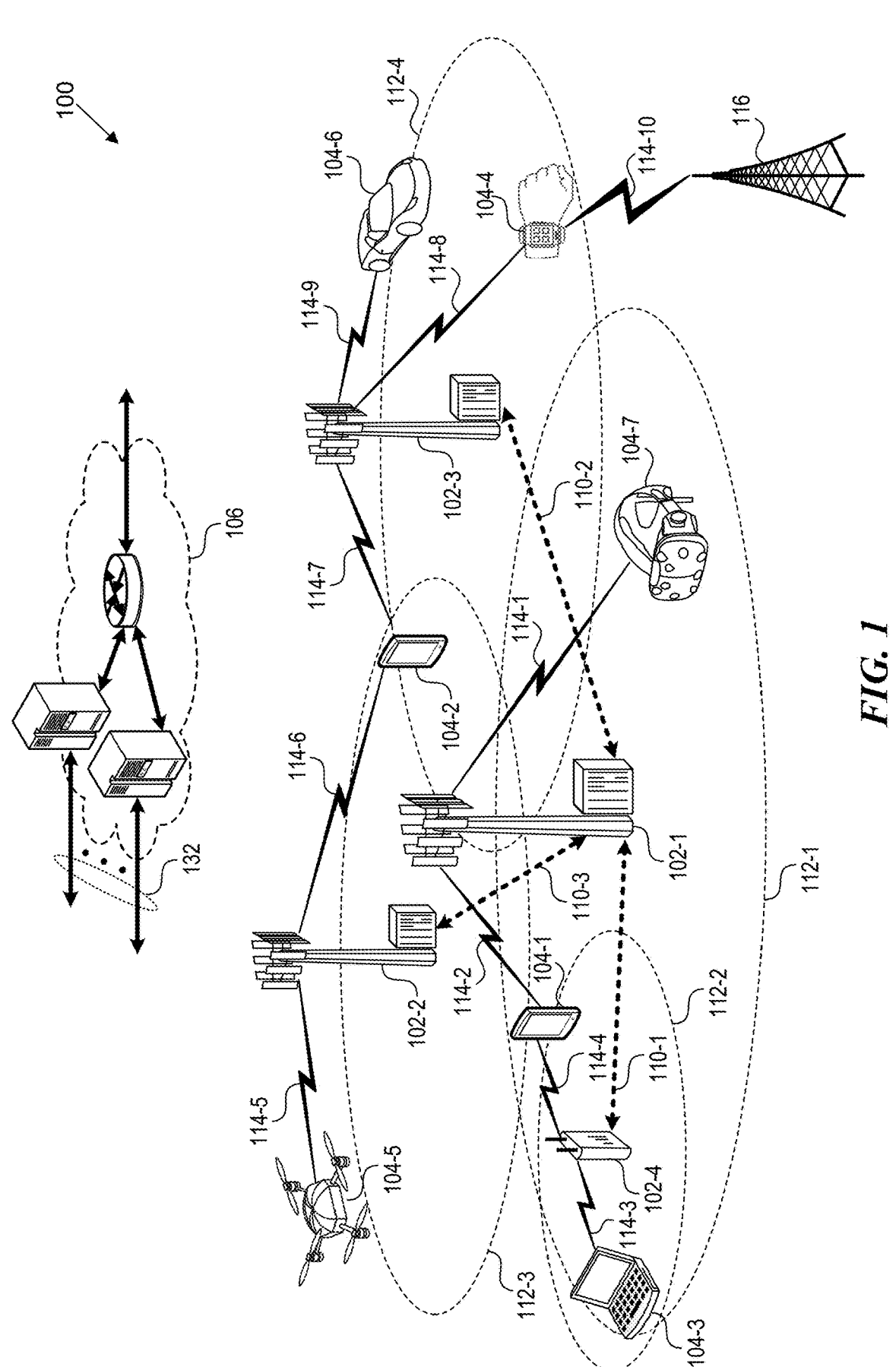
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The FCC regulation requires long-distance traffic (also referred to as inter-Major Trading Area traffic) to be routed to inter-exchange carriers. However, current routing mechanisms require the long-distance traffic to be routed between the packet-based networks and the circuit-based networks, causing unnecessary complexity in handling the network switching. With the advancement in wireless communication technology, the Third-Generation Partnership Project (3GPP) architecture has introduced a subsystem known as the Internet Protocol (IP) Multimedia Subsystem (IMS) to deliver IP multimedia services. This patent documents discloses techniques that can be implemented to enable direct routing of long-distance traffic in the IMS using the IP network. The disclosed routing techniques can use the location information carried in the packet header to optimize communications with a peer IMS layer, thereby bypassing the circuit-based network and eliminating the complexity caused by the switch between the network types. For example, a network node such as the Breakout Gateway Control Function (BGCF) can process the packet header to determine the tracking area and/or the country from which a call has been initiated. Based on the location information, the BGCF can then route the call traffic directly to a peer IMS associated with the inter-exchange carriers so as to eliminate the need to direct the call back to the circuit-based networks.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a Long-Term Evolution (LTE) /LTE Advanced (LTE-A) communication channel, which is referred to as a 4G communication channel. In some implementations, the base station 102 can provide network access to a Fifth-Generation (5G) communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 100 can include a 5G network and/or an LTE/LTE-A or other network. In an LTE/LTE-A network, the term eNB is used to describe the base stations 102 and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

Location-Based Routing for Domestic Calls

In early analog telephone network, when a call is made from one telephone to another, switches within the telephone exchanges create a circuit switching network between the two telephones. To make better use of the available network bandwidth in data communication networks, alternative techniques such as packet switching have become more prevalent and are now the basis for telecommunication networks worldwide.

Figure 2:
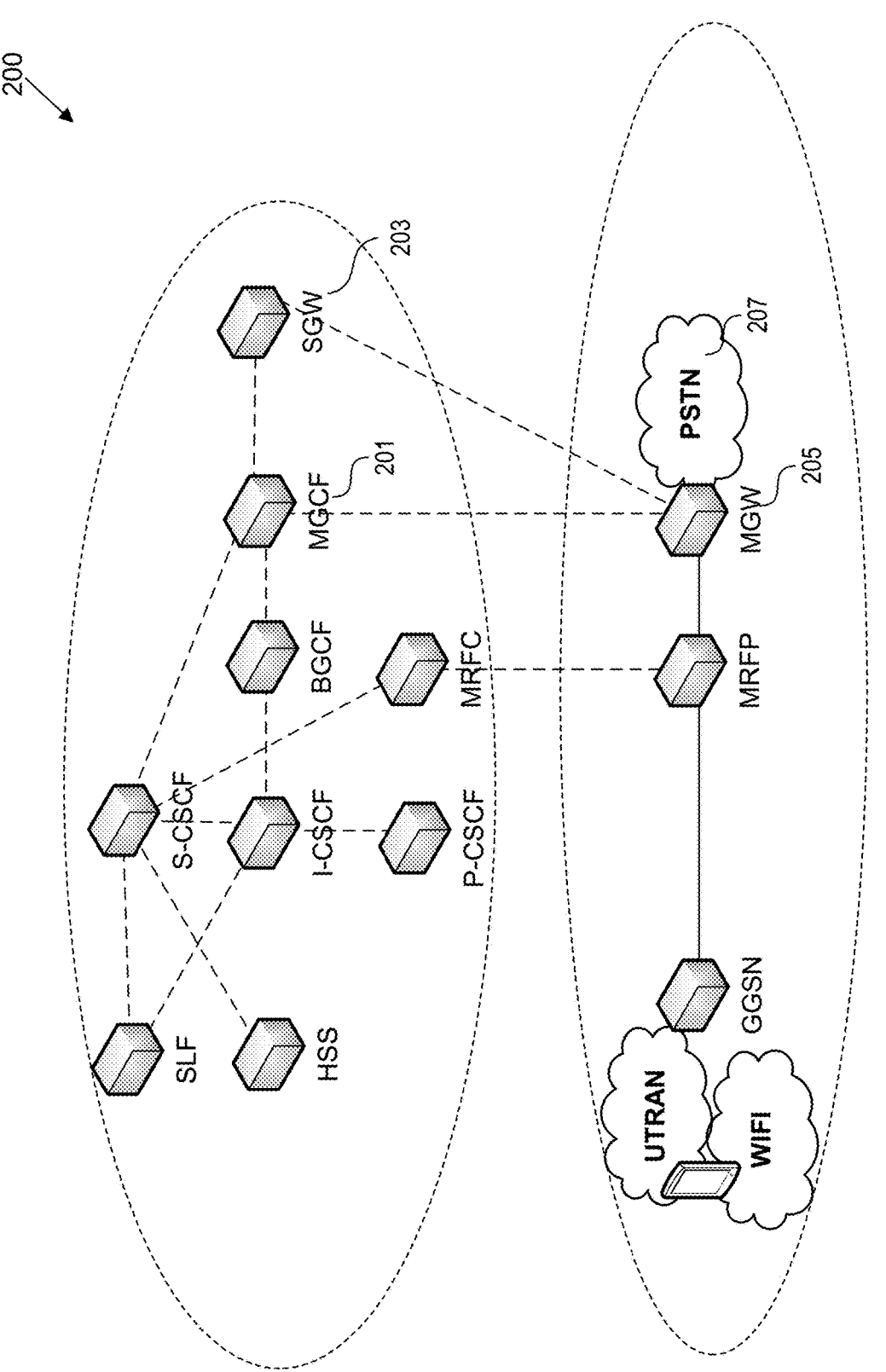
FIG. 2 illustrates an example architecture of the IMS layer.

In addition to the packet-switched domain, the IP IMS has been introduced to deliver IP multimedia services. For control plane signaling between the terminal and the IMS as well as between the components within the IMS, the 3GPP has chosen the Session Initiation Protocol (SIP). FIG. 2 illustrates an example architecture of the IMS layer. As shown in FIG. 2, a media gateway controller function (MGCF) 201 is a SIP endpoint that does call control protocol conversion between SIP and Integrated Services Digital Network User Part (ISUP)/Bearer-Independent Call Control (BICC) and interfaces with the Serving Gateway (SGW) 203 over the Stream Control Transmission Protocol (SCTP). The MGCF 201 also controls the resources in a Media Gateway (MGW) 205 across an H.248 interface with the Public Switched Telephony Network (PSTN) 207, which the traditional circuit-switched telephone network that has been in general use since the late 1800s.

Figure 3:
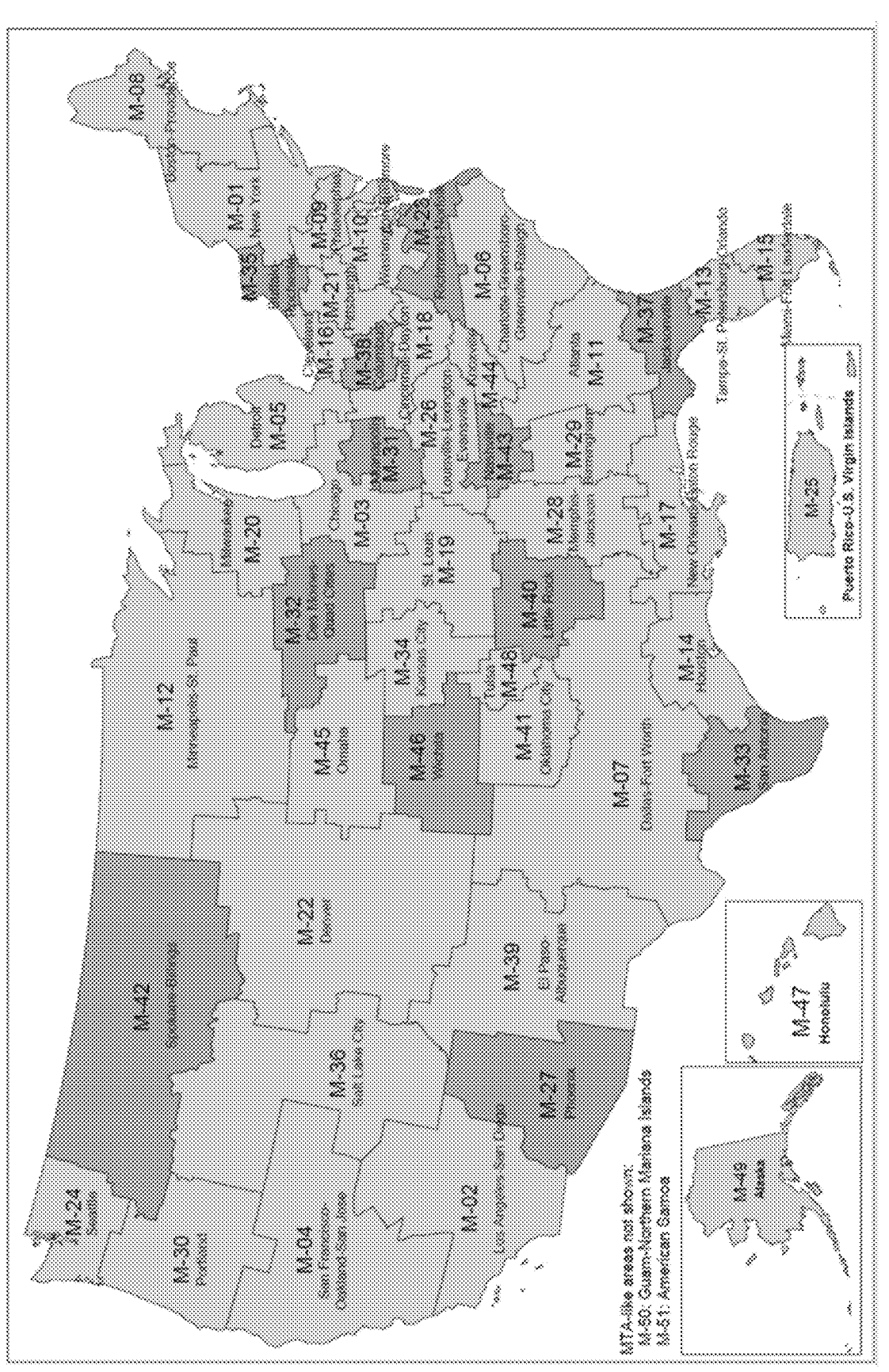
FIG. 3 illustrates the Major Trading Areas (MTAs) assigned by the Federal Communication Commission (FCC).

Since the inception of the Cellular Market Areas in 1982, the FCC has assigned area-based radio licenses. FIG. 3 illustrates the Major Trading Areas (MTAs) assigned by the FCC based on the Rand McNally 1992 Commercial Atlas & Marketing Guide, 123rd Edition. The FCC regulation require inter-MTA traffic to be routed to inter-exchange carriers (telecommunication companies that provide long-distance call services). However, currently the inter-MTA traffic is routed through the PSTN, which inevitably leads to complexity and latency in switching between the packet-based networks and circuit-based networks.

This patent document discloses techniques that can be implemented in various embodiments to bypass the circuit switching networks for routing inter-MTA traffic, thereby fulfilling the FCC requirements yet avoiding the complexity in going through circuit switching networks.

It is noted that instead of relying on MGCF, which is the SIP endpoint in the network architecture, a different network node in the IMS layer can be used to handle location-based routing. For example, the BGCF shown in FIG. 2 is a SIP proxy which processes requests for routing from a Serving-Call Session Control Function (S-CSCF). It includes routing functionality based on telephone numbers and can be used to route traffic to completely bypass the PSTN. In particular, the BGCF can examine the P-Access-Network-Info (PANI)

SIP header to obtain location information provided by the access network, such as Evolved Universal Terrestrial Radio Access (E-UTRA) in Long-Term Evaluation (LTE) communication systems. Other types of headers, such as the Cellular-Network-Info (CNI) can also be used to determine location information of the access network.

In some embodiments, both PANI and CNI are received by the network node, and PANI can be given a higher priority for location information extraction. In some embodiments, the network node can give priority to the network-provided PANI when multiple PANI headers are received.

Figure 4:
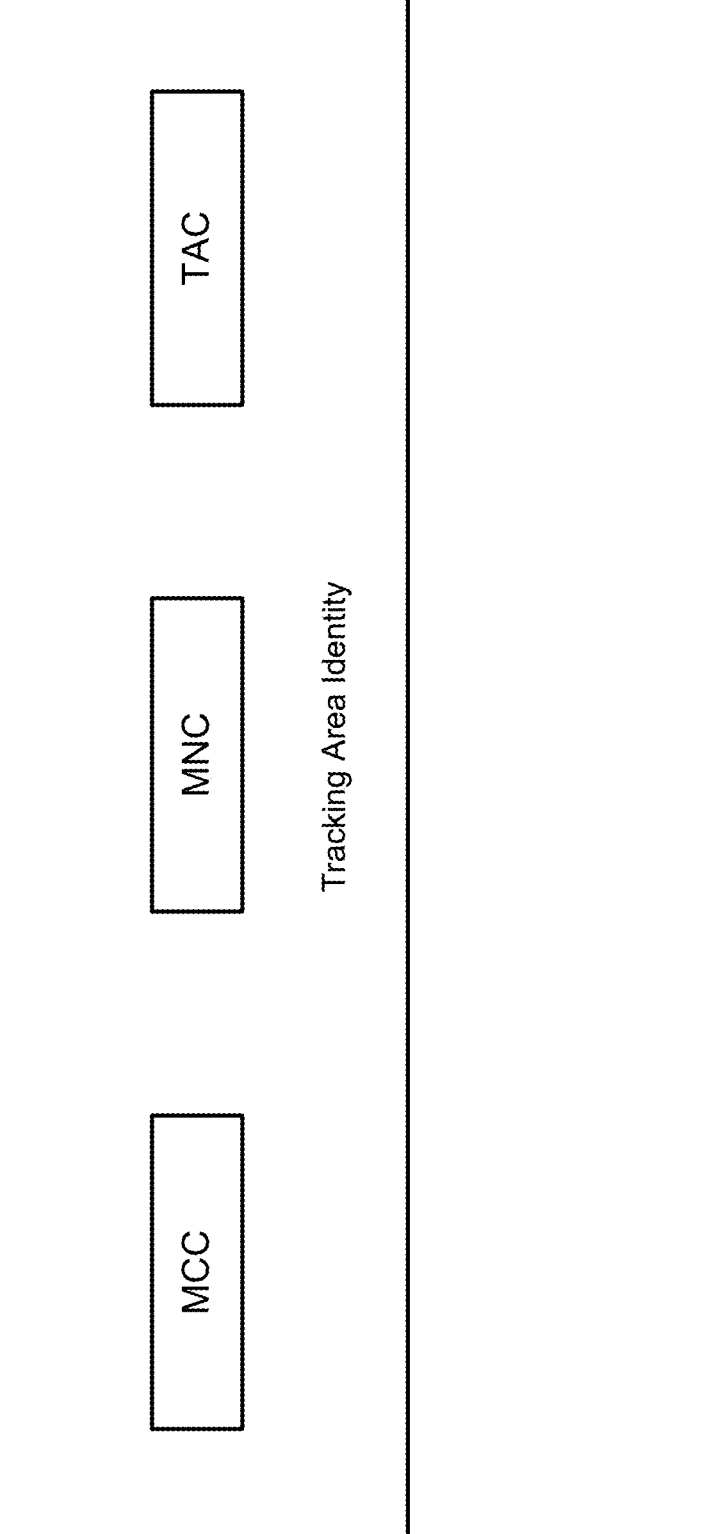
FIG. 4 illustrates an example Tracking Area Information (TAI) format.

The PANI header includes an access-type field identifying the radio access technology (RAT) as received in the RAT-Type attribute. The access-type field is followed by the access-info field which identifies the mobile phone cell that provides network access. The location of this cell provides the means to geographically locate connected mobile handsets. The access-info field is followed by an EQUAL sign ("=") and a Cell Identifier/CGI (Cell Global Identifier) field that contains an octet string which provides the location value contained in the 3GPP-User-Location-Info. In particular, for domestic phone calls, the PANI header includes a Tracking Area Identity (TAI). As shown in FIG. 4, the TAI includes the following elements:

(1) Mobile Country Code (MCC), which identifies the country in which the Public Land Mobile Network (PLMN) is located.

(2) Mobile Network Code (MNC), which is a code identifying the PLMN in that country.

(3) Tacking Area Code (TAC) is a fixed length code identifying a Tracking Area within a PLMN.

For domestic calls, the Tracking Area Code (TAC) value can be mapped to the corresponding MTA value. When a Voice-over-LTE (VoLTE) or WIFI originated call is initiated, the PANI header is examined to determine the TAC value. Given the TAC value, the MTA value can be determined based on the mapping between the TAC and the MTA. The MTA value is then used during route index analysis for the outgoing SIP route. Table 1 shows an example mapping of the high byte of TAC and MTA in accordance with one or more embodiments of the present technology.

TABLE 1

| Example mapping of TAC and MTA values | | |
|---|---|---|
| TAC | MTA | Description |
| 51 | 1 | Long Island |
| 53 | 1 | New York |
| 31 | 2 | Los Angeles |
| 9D | 3 | Chicago |
| 38 | 4 | San Francisco |
| A6 | 5 | Detroit |

Given the MTA value and the current route, the route index for routing the traffic can be determined. Table 2 shows example route indices that corresponding to the MTA values or a range of MTA values. The BGCF can use the route index to route the traffic using an IP network to another peer IMS network, thereby completely bypassing the PSTN and eliminating the additional cost of going through the circuit switching networks.

7

TABLE 2

| Example route indices corresponding to MTA value ranges | | | |
|---|---|---|---|
| Generate Route | minMTA | MaxMTA | Route Index |
| 2 | 1 | 1 | 240 |
| 2 | 3 | 101 | 240 |
| 2 | 103 | 201 | 204 |
| 12 | 1 | 1 | 1008 |
| 12 | 3 | 101 | 1008 |
| 12 | 103 | 201 | 1008 |
| 12 | 203 | 255 | 1008 |

Figure 5A:
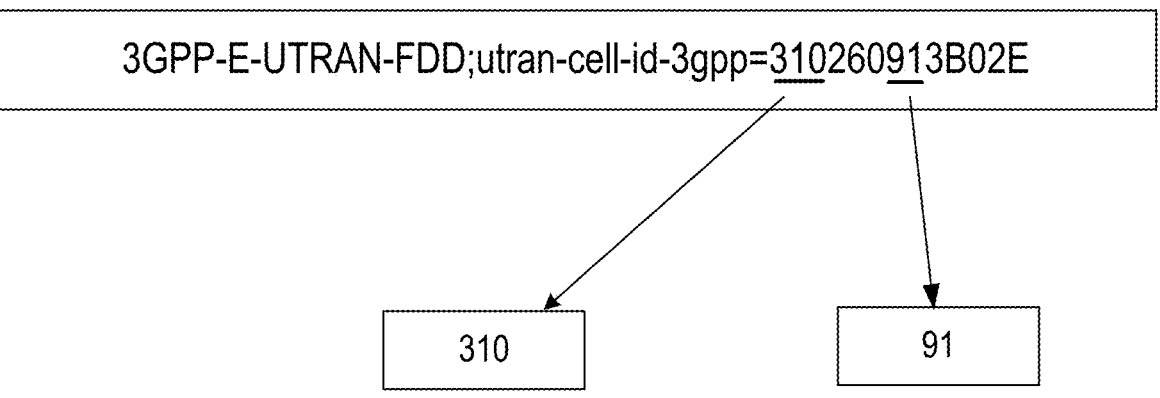
FIG. 5A illustrates an example P-Access-Network-Info (PANI) header for routing of a Voice over Long-Term Evolution (VoLTE) originated call in accordance with one or more embodiments of the present technology.

FIG. 5A illustrates an example PANI header for routing of a VoLTE originated call in accordance with one or more embodiments of the present technology. The PANI header indicates that the access type is 3GPP-E-UTRAN-FDD. The cell ID indicates that the MCC is 310, which means that the call is a domestic call in the United States. The high byte of the TAC is 91. Using the TAC value, the corresponding MTA value can be determined to route the call traffic accordingly.

Figure 5B:
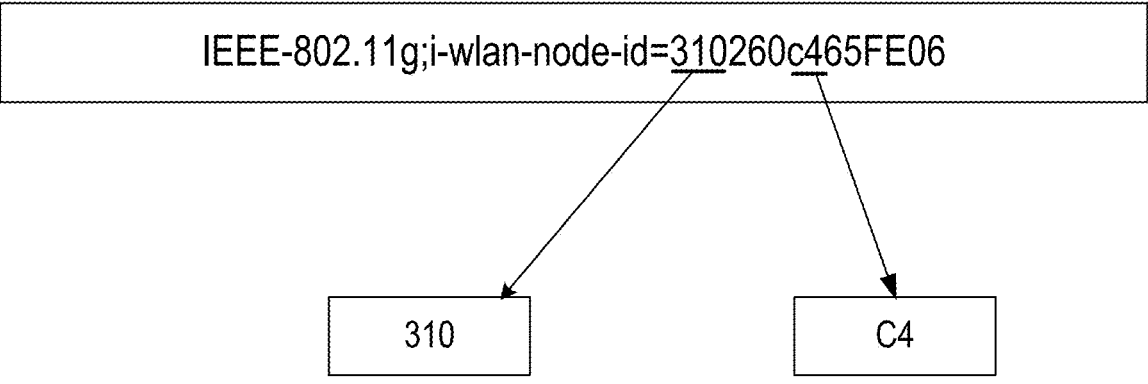
FIG. 5B illustrates an example PANI header for routing of a WIFI originated call in accordance with one or more embodiments of the present technology.

FIG. 5B illustrates an example PANI header for routing of a WIFI originated call in accordance with one or more embodiments of the present technology. The PANI header indicates that the access type is IEEE-802.11g. The wireless local area network (WLAN) node identifier indicates that the MCC is 310, which also means that the call is a domestic call within the United States. The high byte of the TAC is C4. Using the TAC value, the corresponding MTA value can be determined to route the call traffic accordingly.

Location-Based Routing for Heterogeneous Networks (Het-Nets)

In order to offer wireless coverage in different environments, ranging from the open outdoors to office buildings and undergrounds, HetNets are introduced into existing wireless communication systems. HetNets include cellular topologies that involve a mix of radio technologies and cell types (femto, pico, micro, and macro) working together seamlessly.

To ensure location management of HetNets, in which Location Areas (Las), Routing Areas (RAs) and Tracking Areas (Tas) coexist, different TAC values can be assigned to different cell types. Using femto cells as an example, Table 3 shows example TAC values for femto cells assigned in different tracking areas. In some embodiments, mappings for different cell types in HetNets (e.g., Table 3) can be combined with mappings for regular cells (e.g., Table 1) to provide a complete mapping of cell TAC values with the MTA values. In some embodiments, separate mappings can be maintained to allow convenient updates or modifications of the mappings.

TABLE 3

| Example TAC values for femto cells | | |
|---|---|---|
| TAC | MTA | Description |
| C456 | 30 | Portland FEMTO |
| C466 | 24 | Seattle FEMTO |
| C480 | 36 | Salt Lake City FEMTO |
| C554 | 15 | Miami FEMTO |
| C565 | 113 | Orlando FEMTO |

Once the MTA value is determined for a particular cell ID, the call traffic can be routed based on the route index that corresponds to the MTA value (e.g., as shown in Table 2).

Location-Based Routing for Roaming Calls

8

Figure 6:
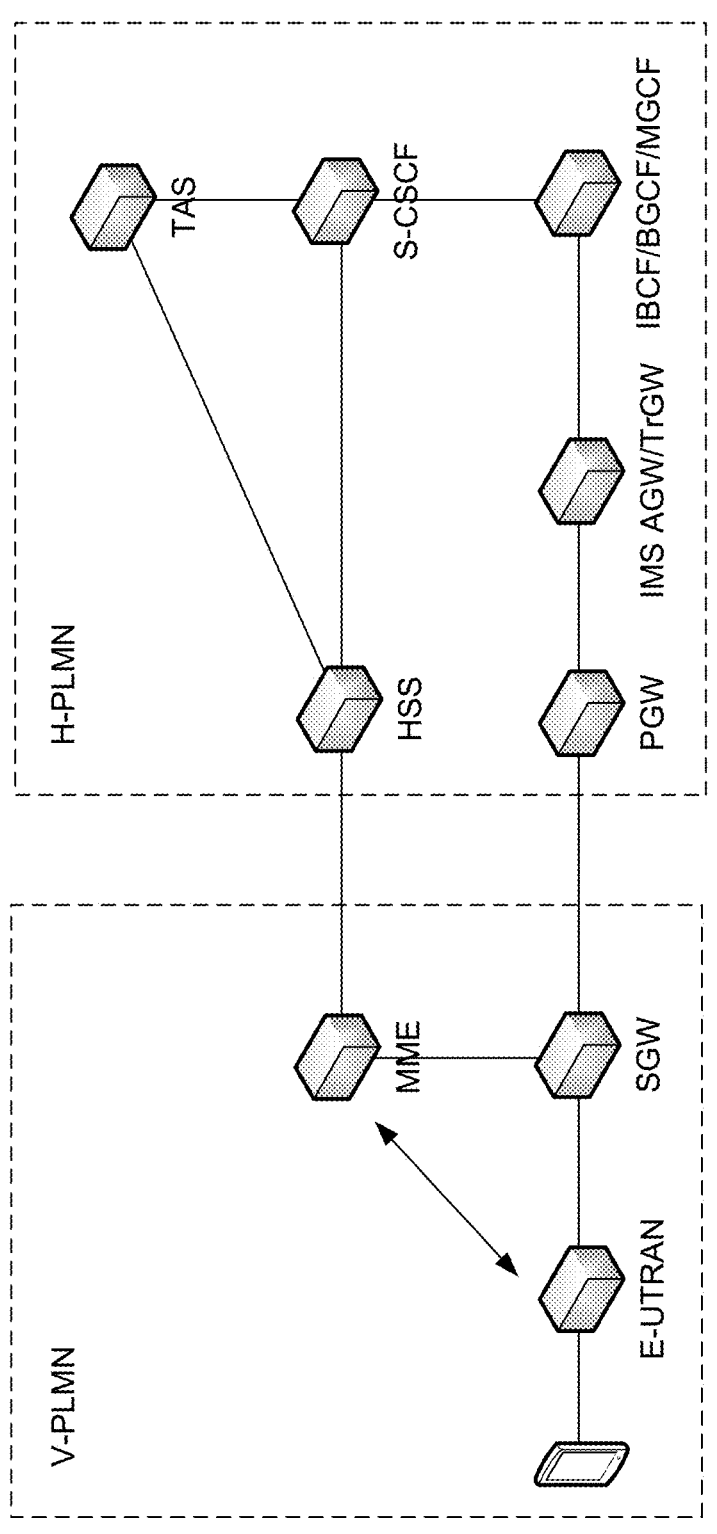
FIG. 6 illustrates an example network architecture for a roaming device.

When the terminal device is a roaming device, the BGCF receives the PANI header from the Visited PLMN (V-PLMN) of the mobile device. FIG. 6 illustrates an example network architecture for a roaming device. In the roaming scenarios, the TAC in the V-PLMN is no longer available in the PANI header to home network operator. To be able to provide reliable routing for international roaming calls, other types of location information carried in the PANI header can be used. For example, as discussed above, the PANI header also carries the MCC/MNC, which can be used to identify the location of the terminal device.

Figure 7A:
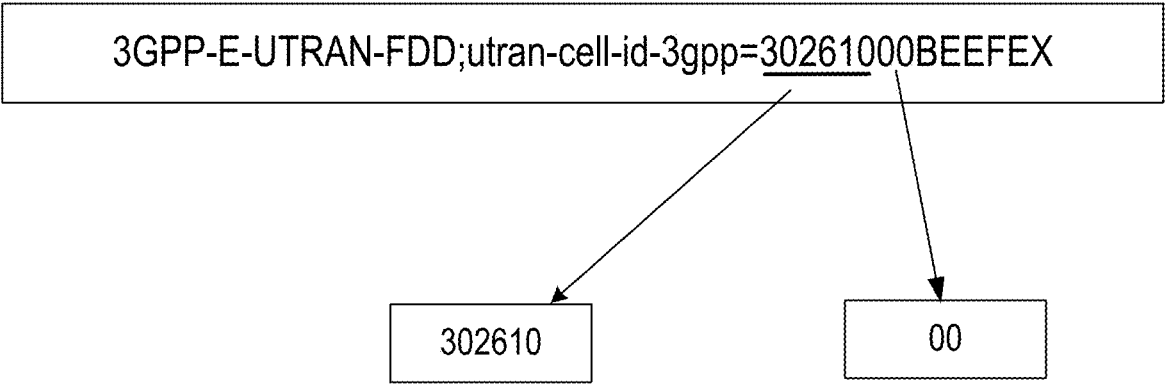
FIG. 7A illustrates an example PANI header for routing of an international call in accordance with one or more embodiments of the present technology.
Figure 7B:
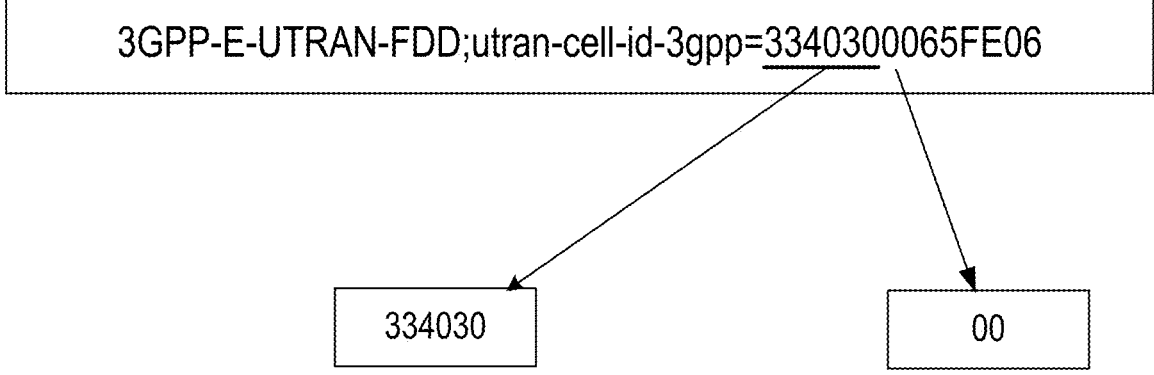
FIG. 7B illustrates another example PANI header for routing of an international call in accordance with one or more embodiments of the present technology.

FIG. 7A illustrates an example PANI header for routing of an international call in accordance with one or more embodiments of the present technology. The PANI header indicates that the access type is 3GPP-E-UTRAN-FDD. The cell ID indicates that the MCC/MNC code is 302610, which means that the call is an international call from Canada Bell Mobility. The high byte of the TAC has a value of 00, indicating that the TAC information in the V-PLMN is not visible. FIG. 7B illustrates another example PANI header for routing of an international call in accordance with one or more embodiments of the present technology. The PANI header indicates that the access type is 3GPP-E-UTRAN-FDD. The cell ID indicates that the MCC/MNC code is 334030, which means that the call is an international call from Mexico Movistar/Pegaso. The high byte of the TAC also has a value of 00 indicating that TAC information in the V-PLMN is not visible.

In some embodiments, all international roaming calls can be assigned a specific MTA value (e.g., 255) to distinguish from domestic calls. In some embodiments, international calls from/to different countries are assigned different MTA values outside of the range of domestic MTA values. Once the MTA value is determined, the route index can be determined correspondingly (e.g., as shown in Table 2).

Figure 8A:
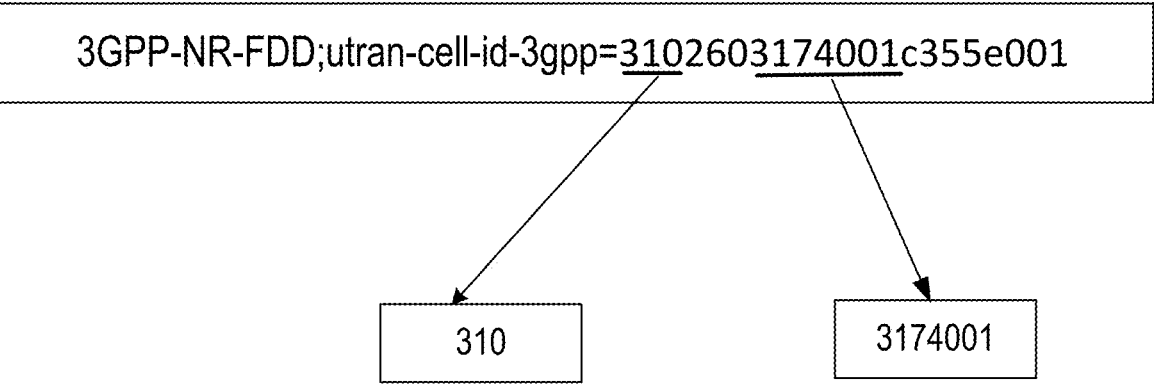
FIG. 8A illustrates an example PANI header for routing of a Voice over New Radio (VoNR) call in accordance with one or more embodiments of the present technology.
Figure 8B:
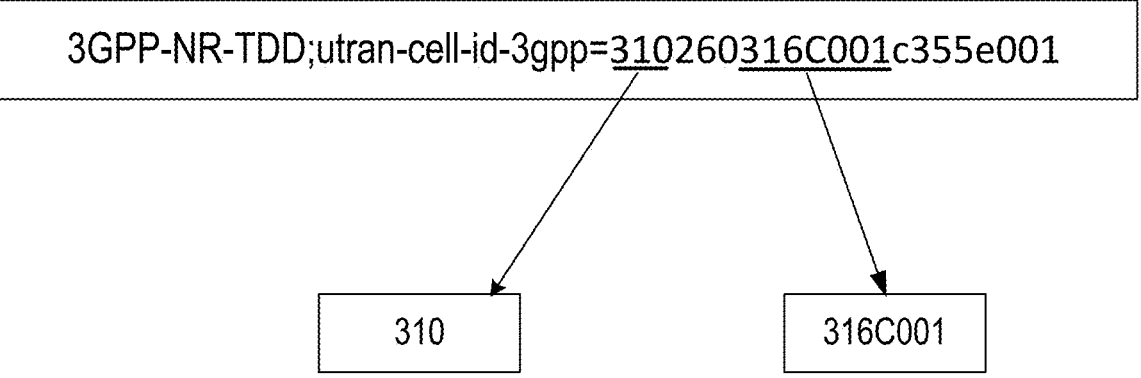
FIG. 8B illustrates another example PANI header for routing of a VoNR call in accordance with one or more embodiments of the present technology.

Extension to the Fifth-Generation (5G) and Future Generations of Communication Systems The disclosed techniques can be adapted to the Fifth-Generation (5G) communication system, or any future generations of communication systems. For example, the 5G communication technology introduces slight format changes to the PANI header. Instead of relying on the high byte of the TAC value (e.g., as shown in LTE systems), the entire TAC value (e.g., the high byte, the mid-byte, and the low byte) can be used to map to the corresponding MTA value. FIG. 8A illustrates an example PANI header for routing of a Voice over New Radio (VoNR) call in accordance with one or more embodiments of the present technology. The PANI header indicates that the access type is 3GPP-NR-FDD, which can be used for 5G networks. The cell ID indicates that the MCC code is 310, which means that the call is a domestic call. The entire TAC value 3174001 can be obtained to determine the corresponding MTA. FIG. 8B illustrates another example PANI header for routing of a VoNR call in accordance with one or more embodiments of the present technology. The PANI header indicates that the access type is 3GPP-NR-TDD, which can also be used in a NR network. The cell ID indicates that the MCC code is 310, which means that the call is a domestic call. The entire TAC value 316C001 can be obtained to determine the corresponding MTA.

The disclosed techniques can also be adapted to future generations of communication systems in which the location information (e.g., TAC value, MCC, and/or MNC) is carried in SIP header or other types of packet headers. For example, based on the access type specifies in the PANI header (or other types of headers), the position and/or lengths of the TAC or MCC/MNC can be identified in the header so as to determine the corresponding MTA.

FIG. 9 is a flow chart representation of a method for wireless communication in accordance with one or more embodiments of the present technology. The method 900 includes, at operation 910, receiving, by a network node in core network, a packet associated with a call that has been initiated for a user device. The method 900 includes, at operation 920, determining, by the network node, location information carried in a header of the packet. The method 900 includes, at operation 930, determining, by the network node using a mapping between location information and Major Trading Are (MTA) values, a MTA value corresponding to the location information carried in the header. The method 900 also includes, at operation 940, routing, by the network node based on the MTA value, the packet using a routing path that bypasses a circuit-switched based network.

It is appreciated that, the disclosed techniques can be used in the IP IMS layer to enable direct routing of inter-MTA traffic, thereby complying with the FCC requirements of inter-exchange carriers routing and eliminating the need of going through circuit-switching networks. The disclosed techniques are applicable to various scenarios (e.g., domestic and international roaming calls) as well as various generations of communication systems (e.g., LTE and 5G systems).

Computer System

Figure 10:
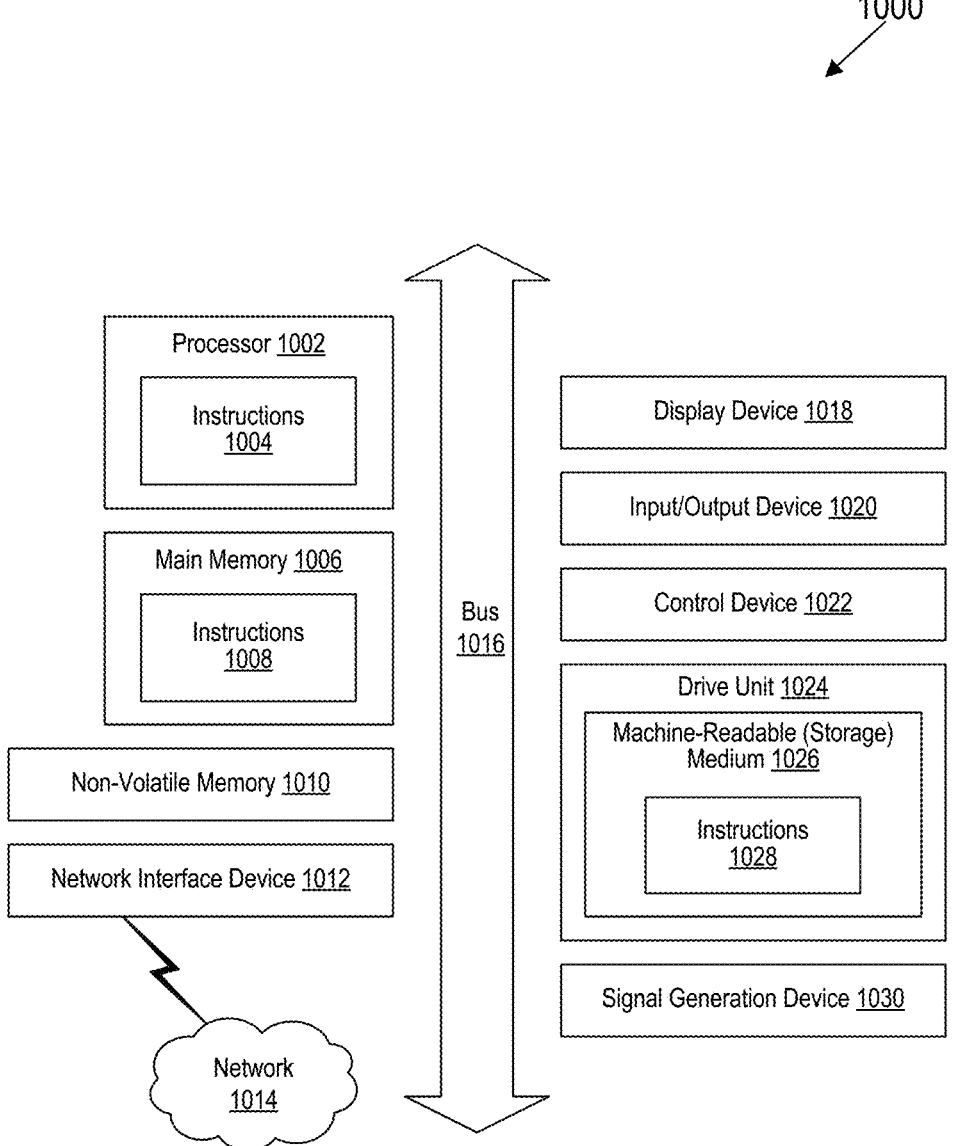
FIG. 10 is a block diagram that illustrates an example of a computer system in which at least some operations described herein can be implemented.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, video display device 1018, an input/output device 920, a control device 1022 (e.g., keyboard and pointing device), a drive unit 1024 that includes a storage medium 1026, and a signal generation device 930 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the figures and any other components described in this specification can be implemented.

The computer system 1000 can take any suitable physical form. For example, the computing system 1000 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1-00. In some implementation, the computer system 1000 can be an embedded computer system, a system-on-chip (SOC), a single-board computer system (SBC) or a distributed system such as a mesh of computer systems or include one or more cloud components in one or more networks. Where appropriate, one or more computer systems 1000 can perform operations in real-time, near real-time, or in batch mode.

The network interface device 1012 enables the computing system 1000 to mediate data in a network 1014 with an entity that is external to the computing system 1000 through any communication protocol supported by the computing system 1000 and the external entity. Examples of the network interface device 1012 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/or associated caches and servers) that store one or more sets of instructions 1028. The machine-readable (storage) medium 1026 can include any medium that is capable of storing, encoding, or carrying a set of instructions for execution by the computing system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computing system 1000 to perform operations to execute elements involving the various aspects of the disclosure.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method for wireless communications, comprising:
receiving, by a network node in a communication network, a packet associated with a long-distance call from a wireless user device;
wherein the communication network includes an Internet Protocol (IP) Multimedia Subsystem (IMS) layer;
determining, by the network node, location information carried in a header of the packet;
identifying, using a Major Trading Area (MTA) value that is mapped to the location information, an outgoing route that bypasses a circuit-switched based network; and
routing, by the network node using the outgoing route, the packet to a peer network node that includes an IMS layer,
wherein the outgoing route to the peer network node is identified by a route index.

2. The method of claim 1, wherein the header of the packet comprises at least a Cellular-Network-Info (CNI) header or a P-Access-Network-Info (PANI) header.

3. The method of claim 2, wherein the PANI header is given a higher priority than the CNI header for the determining of the location information in response to both the CNI header and the PANI header being present in the header of the packet.

4. The method of claim 1, wherein the MTA value is mapped to at least one byte of a Tacking Area Code (TAC) value in the location information.

5. The method of claim 4, wherein the MTA value is mapped to a highest byte of the TAC value in the location information.

6. The method of claim 4, wherein the MTA value is mapped to an entirety of the TAC value in the location information.

7. The method of claim 4, wherein different ranges of TAC values correspond to different cell types.

8. The method of claim 1, wherein the MTA value is mapped to at least one of a Mobile Country Code (MCC) value or a Mobile Network Code (MNC) value.

9. The method of claim 1, wherein a range of MTA values is assigned to domestic calls, and wherein international calls associated with different countries are assigned MTA values outside of the range.

10. A device for wireless communication, comprising a processor that is configured to:

receive, in a communication network, a packet associated with a long-distance call from a user device;

determine location information carried in a header of the packet;

identify, using a Major Trading Area (MTA) value that is mapped to the location information, an outgoing route that bypasses a circuit-switched based network, wherein a range of MTA values is assigned to domestic calls, and wherein international calls associated with different countries are assigned MTA values outside of the range; and route, using the outgoing route, the packet to a peer network node that includes an IMS layer.

11. The device of claim 10, wherein the header of the packet comprises at least a Cellular-Network-Info (CNI) header or a P-Access-Network-Info (PANI) header.

12. The device of claim 11, wherein the PANI header is given a higher priority than the CNI header to determine the location information in response to both the CNI header and the PANI header being present in the header of the packet.

13. The device of claim 10, wherein the MTA value is mapped to at least one byte of a Tacking Area Code (TAC) value in the location information.

14. The device of claim 13, wherein the MTA value is mapped to a highest byte of the TAC value in the location information.

15. The device of claim 13, wherein the MTA value is mapped to an entirety of the TAC value in the location information.

16. The device of claim 13, wherein different ranges of TAC values correspond to different cell types.

17. The device of claim 10, wherein the MTA value is mapped to at least one of a Mobile Country Code (MCC) value or a Mobile Network Code (MNC) value.

18. A non-transitory, computer-readable storage medium comprising instructions recorded thereon that, when executed by at least one processor of a system of a wireless telecommunications network, cause the system to:

receive, in a communication network, a packet associated with a long-distance call from a wireless user device;

wherein the communication network includes an Internet Protocol (IP) Multimedia Subsystem (IMS) layer;

determine location information carried in a header of the packet;

identify, using a Major Trading Area (MTA) value that is mapped to the location information, an outgoing route that bypasses a circuit-switched based network; and route, using the outgoing route, the packet to a peer network node that includes an IMS layer, wherein the outgoing route to the peer network node is identified by a route index.

* * * * *